United States Patent
Corcoran et al.

(10) Patent No.: US 11,376,828 B2
(45) Date of Patent: Jul. 5, 2022

(54) POLYETHYLENE FILM STRUCTURES AND RELATED METHODS

(71) Applicant: Equistar Chemicals, LP, Houston, TX (US)

(72) Inventors: Lindsay E. Corcoran, Liberty Township, OH (US); Thomas J. Schwab, Loveland, OH (US)

(73) Assignee: Equistar Chemicals, LP, Houston, TX (US)

( * ) Notice: Subject to any disclaimer, the term of this patent is extended or adjusted under 35 U.S.C. 154(b) by 132 days.

(21) Appl. No.: 16/659,776

(22) Filed: Oct. 22, 2019

(65) Prior Publication Data

US 2020/0122445 A1 Apr. 23, 2020

Related U.S. Application Data

(60) Provisional application No. 62/748,860, filed on Oct. 22, 2018.

(51) Int. Cl.
*B32B 27/32* (2006.01)
*B32B 27/30* (2006.01)

(52) U.S. Cl.
CPC ............ *B32B 27/32* (2013.01); *B32B 27/306* (2013.01); *B32B 2250/03* (2013.01); *B32B 2250/242* (2013.01); *B32B 2307/406* (2013.01); *B32B 2307/412* (2013.01); *B32B 2307/5825* (2013.01)

(58) Field of Classification Search
CPC .............................. B32B 27/32; B32B 27/306
USPC ........................................................ 428/195.1
See application file for complete search history.

(56) References Cited

U.S. PATENT DOCUMENTS

| | | |
|---|---|---|
| 2015/0312593 A1 | 10/2015 | Akeley et al. |
| 2016/0060425 A1 | 3/2016 | Falla et al. |
| 2016/0115284 A1 | 4/2016 | Schwab |
| 2020/0122445 A1* | 4/2020 | Corcoran ................ B32B 27/18 |

OTHER PUBLICATIONS

NOVA Chemicals, Polyethylene (Year: 2018).*
International Search Report and Written Opinon dated Jan. 30, 2020 for Corresponding PCT/US2019/057401.

* cited by examiner

*Primary Examiner* — Betelhem Shewareged

(57) ABSTRACT

Film structures and related methods and uses thereof are described herein. One or more of the film structures generally include an A layer, a B layer and a C layer. The B layer is positioned between the A layer and the C layer. The A layer includes high density polyethylene. The B layer includes linear low density polyethylene and a nucleating agent. The C layer includes one or more polymers. One or more of the related methods include methods for producing film structures including an A layer, a B layer, and a C layer.

18 Claims, 4 Drawing Sheets

POLYETHYLENE FILM STRUCTURES AND RELATED METHODS

CROSS-REFERENCE TO RELATED APPLICATIONS

This application is the Non-Provisional Patent Application, which claims benefit of priority to U.S. Provisional Application No. 62/748,860 filed Oct. 22, 2018, the contents of which are incorporated herein by reference in their entirety.

STATEMENT REGARDING FEDERALLY SPONSORED RESEARCH OR DEVELOPMENT

Not applicable.

FIELD

The present disclosure generally relates to polyethylene film structures and related methods. More specifically, the present disclosure relates to polyethylene film structures having certain moisture transmission, optical, and mechanical properties, and related methods and uses thereof.

BACKGROUND

This section introduces information that may be related to or provide context for some aspects of the techniques described herein and/or claimed below. This information is background facilitating a better understanding of that which is disclosed herein. Such background may include a discussion of "related" art. That such art is related in no way implies that it is also "prior" art. The related art may or may not be prior art. The discussion is to be read in this light, and not as admissions of prior art.

For film applications requiring films with the ability to resist moisture transmission (e.g., cereal, cookie, and cracker packaging), film producers often seek a balance of certain moisture transmission and mechanical properties. The term used to describe the ability of a film structure to resist moisture transmission is water vapor transmission rate (WVTR). Lower values of water vapor transmission rate (WVTR) indicate better moisture protection. Conversely, high values of water vapor transmission rate (WVTR), indicate poorer moisture protection. To improve manufacturing economics, film producers can make their films thinner so as to produce more square meters of film with the same material input in a process known as "down gauging". However, film producers often do not desire to down gauge at the expense of the water vapor transmission rate (WVTR) and certain optical and mechanical properties (e.g., gloss, haze, and machine direction (MD) tear strength) of the film structure.

Thus, a need exists for film structures with reduced tendency to transmit moisture, while maintaining the desired optical and mechanical properties for the end-use application.

SUMMARY

In general, the present disclosure provides a film structure that includes: an A layer, including high density polyethylene; a B layer including linear low density polyethylene and a nucleating agent; and a C layer including one or more polymers. The B layer may be positioned between the A layer and the C layer. The film structure has a 1% secant modulus in the machine direction ranging from 45,000 to 75,000 psi (310 to 517 MPa), as measured according to ASTM D 882; a machine direction tear strength ranging from 140 to 600 grams, as measured according to ASTM D 1922; and a normalized water vapor transmission rate ranging from 0.38 to 0.68 grams/100 in$^2$/day (5.89 to 10.54 g/m$^2$/day), as measured according to ASTM F 1249. The C layer has a melt index ranging from 0.1 to 3.0 g/10 min, as measured according to ASTM D 1238; and a density ranging from 0.910 to 0.955 g/cm$^3$, as measured according to ASTM D 1505.

One or more aspects include the film structure of the preceding paragraph in which the B layer may be present in an amount ranging from 50 to 70 wt. %, based on the total weight of the film structure.

One or more aspects include the film structure of any preceding paragraph in which the A layer may be present in an amount ranging from 15 to 25 wt. %, based on the total weight of the film structure.

One or more aspects include the film structure of any preceding paragraph in which the film structure has a transverse direction tear strength ranging from 550 to 1,200 grams, as measured according to ASTM D 1922.

One or more aspects include the film structure of any preceding paragraph in which the film structure has a 1% secant modulus in the transverse direction ranging from 50,000 to 70,000 psi (345 to 483 MPa), as measured according to ASTM D 882.

One or more aspects include the film structure of any preceding paragraph in which the film structure has a gloss ranging from 42 to 52 as measured according to ASTM D 2457.

One or more aspects include the film structure of any preceding paragraph in which the film structure has a haze ranging from 15% to 20%, as measured according to ASTM D 1003.

One or more aspects include the film structure of any preceding paragraph in which the nucleated linear low density polyethylene has a melt index ranging from 0.4 to 1.2 g/10 min, as measured according to ASTM D 1238.

One or more aspects include the film structure of any preceding paragraph in which the linear low density polyethylene has a density ranging from 0.910 to 0.922 g/cm$^3$, as measured according to ASTM D 1505.

One or more aspects include the film structure of any preceding paragraph in which the linear low density polyethylene has a polydispersity index ranging from 2.0 to 16.0, as measured by ASTM D 6474-12.

One or more aspects include the film structure of any preceding paragraph in which the linear low density polyethylene includes ethylene derived units copolymerized with a comonomer selected from the group consisting of 1-butene, 1-hexene, 1-octene, and any combination of two or more of the foregoing.

One or more aspects include the film structure of any preceding paragraph in which the comonomer may be present in an amount ranging from 4 to 30 wt. %, based upon the total weight of the linear low density polyethylene.

One or more aspects include the film structure of any preceding paragraph in which the nucleating agent may be present in an amount ranging from 0.05 wt. % to 0.30 wt. %, based on the total weight of the B layer.

One or more aspects include the film structure of any preceding paragraph in which the nucleating agent includes one or more of metal carboxylates, metal aromatic carboxylate, hexahydrophthalic acid metal salts, stearates, organic phosphates, bisamides, sorbitols, and any combination of two or more of the foregoing.

One or more aspects include the film structure of any preceding paragraph in which the high density polyethylene has: a melt index ranging from 0.4 to 2.5 g/10 min, as measured according to ASTM D 1238; and a density ranging from 0.940 to 0.970 g/cm$^3$, as measured according to ASTM D 1505.

One or more aspects include the film structure of any preceding paragraph in which the one or more polymers of the C layer are selected from the group consisting of LDPE, ethylene vinyl acetate copolymer (EVA), metallocene-derived LLDPE, ionomer, and any combination of two or more of the foregoing.

One or more aspects include the film structure of any preceding paragraph in which the A layer further comprises a nucleating agent.

Also, in general, the present disclosure provides a method that includes film blowing an A layer; a B layer; and a C layer so as to form a film structure having the B layer positioned between the A layer and the C layer. The film structure has a 1% secant modulus in the machine direction ranging from 45,000 to 75,000 psi (310 to 517 MPa), as measured according to ASTM D 882; a machine direction tear strength ranging from 140 to 600 grams, as measured according to ASTM D 1922; and a normalized water vapor transmission rate ranging from 0.38 to 0.68 grams/100 in$^2$/day (5.89 to 10.54 g/m$^2$/day), as measured according to ASTM F 1249. The A layer includes high density polyethylene. The B layer includes linear low density polyethylene, and a nucleating agent. The C layer includes one or more polymers. The C layer has a melt index ranging from 0.1 to 3.0 g/10 min, as measured according to ASTM D 1238; and a density ranging from 0.912 to 0.955 g/cm$^3$, as measured according to ASTM D 1505.

One or more aspects include the method of any preceding paragraph in which the film structure has a gloss ranging from 42 to 52 as measured according to ASTM D 2457; a haze ranging from 15% to 20%, as measured according to ASTM D 1003; a transverse direction tear strength ranging from 550 to 1,200 grams, as measured according to ASTM D 1922; and a 1% secant modulus in the transverse direction ranging from 50,000 to 70,000 psi (345 to 483 MPa), as measured according to ASTM D 882.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

BRIEF DESCRIPTION OF THE DRAWINGS

The claimed subject matter may be understood by reference to the following description taken in conjunction with the accompanying drawings, in which like reference numerals identify like elements, and in which:

Figure 1:
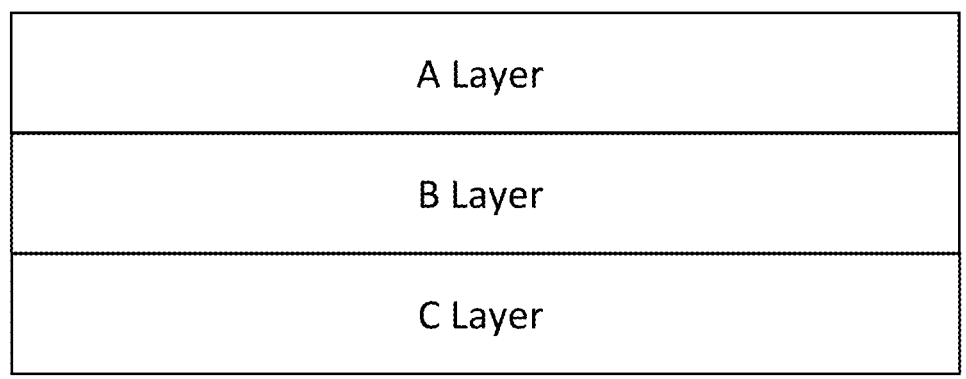
FIG. 1 presents an illustration of a 3-layer film structure according to an aspect of the present disclosure.

While the claimed subject matter is susceptible to various modifications and alternative forms, the drawings illustrate specific embodiments herein described in detail by way of example. It should be understood, however, that the description herein of specific embodiments is not intended to limit the claimed subject matter to the particular forms disclosed, but on the contrary, the intention is to cover all modifications, equivalents, and alternatives falling within the spirit and scope as defined by the appended claims.

DEFINITIONS

To define more clearly the terms used in this disclosure, the following definitions are provided. Unless otherwise indicated, the following definitions are applicable to this disclosure. To the extent that any definition or usage provided by any document incorporated here by reference conflicts with the definition or usage provided herein, the definition or usage provided in this disclosure controls.

In this disclosure, features of the subject matter are described such that, within particular aspects, a combination of different features can be envisioned. For each and every aspect and each and every feature disclosed herein, all combinations that do not detrimentally affect the designs, compositions, processes, or methods described herein are contemplated with or without explicit description of the particular combination. Additionally, unless explicitly recited otherwise, any aspect or feature disclosed herein can be combined to describe inventive designs, compositions, processes, or methods consistent with the present disclosure.

In this disclosure, while compositions and methods are often described in terms of "comprising" various components or steps, the compositions and methods can also "consist essentially of" or "consist of" the various components or steps, unless stated otherwise. For example, a film structure consistent with aspects of the disclosed subject matter can comprise; alternatively, can consist essentially of; or alternatively, can consist of; an A layer, a B layer, and a C layer.

The terms "a," "an," and "the" are intended to include plural alternatives, e.g., at least one, one or more, and one or more than one, unless otherwise specified. For example, the disclosure of "high density polyethylene" or "low density polyethylene," is meant to encompass one, or mixtures or combinations of more than one, high density polyethylene polymer or low density polyethylene polymer, unless otherwise specified.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer includes ethylene homopolymers, ethylene copolymers (e.g., ethylene/a-olefin copolymers), ethylene terpolymers, and the like, as well as blends or mixtures thereof. Thus, an ethylene polymer encompasses polymers often referred to in the art as LDPE (low density polyethylene), LLDPE (linear low density polyethylene), and HDPE (high density polyethylene). As an example, LLDPE includes olefin homopolymers, copolymers, terpolymers, and the like, as well as alloys and blends thereof. Similarly, LLDPE includes olefin homopolymers, copolymers, terpolymers, and the like, as well as alloys and blends thereof. As a further example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, if present and unless stated otherwise, and such configurations can include isotactic, syndiotactic, and random symmetries.

The term "nucleating agent" means a material either added to or present in a system such as a thermoplastic polymer, which induces either homogeneous or heterogeneous nucleation. Nucleating agents generally function by forming nuclei or providing sites for the formation and/or growth of crystals in the thermoplastic polymer as it solidifies from a molten state. The nuclei or sites provided by the nucleating agent allow the crystals to form within the cooling polymer at a higher temperature and/or at a more rapid rate than the crystals will form in the virgin, non-nucleated thermoplastic polymer. These effects can then permit processing of a nucleated thermoplastic polymer composition at cycle times that are shorter than the virgin, non-nucleated thermoplastic polymer. Thus, for example, nucleated linear low density polyethylene (LLDPE) or nucleated high density polyethylene (HDPE) includes LLDPE or HPDE in which a nucleating agent has been added to or is present in the LLDPE thereby inducing nucleation in the LLDPE.

Although any methods and materials similar or equivalent to those described herein can be used in the practice or testing of the subject matter described herein, the typical methods and materials are herein described.

All publications and patents mentioned herein are incorporated herein by reference for the purpose of describing and disclosing, for example, the constructs and methodologies that are described in the publications, which can be used in connection with the presently described subject matter.

Various numerical ranges are disclosed herein. When a range of any type is disclosed or claimed herein (e.g., "ranging from . . . ", "in a range of from . . . ", "in the range of from . . . ") the intent is to disclose or claim individually each possible number that such a range could reasonably encompass, including end points of the range as well as any sub-ranges and combinations of sub-ranges encompassed therein, unless otherwise specified. For example, the present application discloses that the linear low density polyethylene can have, in certain aspects, a melt index ranging or in a range from 0.6 to 1.0 g/10 min. By a disclosure that the melt index of the linear low density polyethylene can be in a range or ranging from 0.6 to 1.0 g/10 min, the intent is to recite that the melt index can be any melt index within the range and, for example, can be equal to 0.6, 0.7, 0.8, 0.9, or 1.0 g/10 min. Additionally, the melt index can be within any range from 0.6 to about 1.0 g/10 min (for example, the melt index can be in a range 0.7 to 0.9 g/10 min), and this also includes any combination of ranges between 0.6 and 0.9 g/10 min. Likewise, all other ranges disclosed herein should be interpreted in a manner similar to this example.

The term "about" means that amounts, sizes, formulations, parameters, and other quantities and characteristics are not and need not be exact, but may be approximate including being larger or smaller, as desired, reflecting tolerances, conversion factors, rounding off, measurement errors, and the like, and other factors known to those of skill in the art in general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" does not include deviations from a recited value in an amount greater than 5% of that value. For example, the value about 5 does not include values beyond 4.75 and 5.25.

In this disclosure, "MD" refers to machine direction, and "CD" refers to cross direction. The cross direction can also be referred to herein as the transverse direction (TD).

Various physical properties of film structures, as well as of the components that are used to form these films, are discussed throughout this disclosure. The following is a listing of physical properties and their corresponding analytical test procedures and conditions:

The term "mil" as used herein equals 0.001 inch.

The ASTM references provided in this disclosure refer to the most updated testing method as of the date this disclosure is filed, unless otherwise noted or as would be otherwise understood by an ordinarily-skilled artisan.

The term "haze" as used herein refers to the percentage of transmitted light that in passing through the polymer deviates from the incident beam by forward scattering. In some commercial hazemeters only light deviating more than 2.5° from the transmitted beam direction is considered haze. In general, the effect of haze is to impart a cloudy or milky appearance to the sample, but its transparency need not be reduced. Transparency is defined as the state permitting perception of objects through or beyond the specimen. For example, a sample of low transparency may not exhibit haze, but objects seen through it will appear blurred or distorted.

The term "ASTM D 882" as used herein refers to the standard test method for determining tensile properties of thin plastic sheeting. Tensile properties determined by this test method are of value for the identification and characterization of materials for control and specification purposes. Tensile properties can vary with specimen thickness, method of preparation, speed of testing, type of grips used, and manner of measuring extension. Consequently, where precise comparative results are desired, these factors must be carefully controlled. This test method shall be used for referee purposes, unless otherwise indicated in particular material specifications. For many materials, there can be a specification that requires the use of this test method, but with some procedural modifications that take precedence when adhering to the specification. For the referenced ASTM standards, visit the ASTM website, www.astm.org, or contact ASTM Customer Service at service@astm.org.

The term "ASTM D 1505" as used herein refers to a method of testing density. The method uses a density-gradient column on a compression-molded specimen that has been slowly cooled (i.e. over a period of 10 minutes or more) to room temperature (23° C.) and allowed to age for a sufficient time that the density is constant within +/−0.001 g/cm$^3$.

The term "ASTM D 1238" as used herein refers to the standard test method for determining melt flow rates of thermoplastics by extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. Unless specified otherwise, the melt flow rate or melt index according to ASTM D 1238 was tested/ specified for polyethylene (e.g., LLDPE, LDPE, HPDE) at 190° C. with a load of 2.16 kg, and the melt flow rate or melt index according to ASTM D 1238 is measured/specified for all other materials at the test conditions for other materials as listed in ASTM D 1238. This test method was approved on Feb. 1, 2012 and published March 2012, the contents of which are incorporated herein by reference in its entirety. For the referenced ASTM standards, visit the ASTM website, www.astm.org, or contact ASTM Customer Service at service@astm.org.

The term "ASTM D 1746" as used herein refers to the standard test method for determining transparency of plastic sheeting. The attribute of clarity of a sheet, measured by its ability to transmit image-forming light, correlates with its regular transmittance. Sensitivity to differences improves with decreasing incident beam- and receptor-angle. If the angular width of the incident beam and of the receptor aperture (as seen from the specimen position) are of the order of 0.1° or less, sheeting of commercial interest have a range of transparency of about 10 to 90% as measured. by this test. Results obtained by the use of this test method are greatly influenced by the design parameters of the instruments; for example, the resolution is largely determined by the angular width of the receptor aperture. Caution should therefore be exercised in comparing results obtained from different instruments, especially for samples with low regular transmittance. Regular transmittance data in accordance with this test method correlate with the property commonly known as "see-through," which is rated subjectively by the effect of a hand-held specimen on an observer's ability to distinguish clearly a relatively distant target. This correlation is poor for highly diffusing materials because of interference of scattered light in the visual test. This test method was approved on Feb. 1, 2009 and published March 2009, the contents of which are incorporated herein by reference in its entirety. For the referenced ASTM standards, visit the ASTM website, www.astm.org, or contact ASTM Customer Service at service@astm.org.

The term "ASTM D 1003" as used herein refers to the standard test method for determining the haze and luminous transmittance of transparent plastics. In general, this test method covers the evaluation of specific light-transmitting and wide-angle-light-scattering properties of planar sections of materials such as essentially transparent plastic. Light that is scattered upon passing through a film or sheet of a material can produce a hazy or smoky field when objects are viewed through the material. Another effect can be veiling glare, as occurs in an automobile windshield when driving into the sun. According to this method, the haze measurements are made with either a hazemeter or a spectrophotometer. Unless specified otherwise, haze measurements according to ASTM D 1003 were tested/specified at an average film thickness of 2.0 mil. This test method was approved on Apr. 15, 2011 and published April 2011, the contents of which are incorporated herein by reference in its entirety. For the referenced ASTM standards, visit the ASTM website, www.astm.org, or contact ASTM Customer Service at service@astm.org.

The term "ASTM D 2457" as used herein refers to the standard test method for determining specular gloss of plastic films and solid plastics. In general, this test method describes procedures for the measurement of gloss of plastic films and solid plastics, both opaque and transparent. Specular gloss is used primarily as a measure of the shiny appearance of films and surfaces. Precise comparisons of gloss values are meaningful only when they refer to the same measurement procedure and same general type of material. In particular, gloss values for transparent films should not be compared with those for opaque films, and vice versa. Gloss is a complex attribute of a surface which cannot be completely measured by any single number. Specular gloss usually varies with surface smoothness and flatness. It is sometimes used for comparative measurements of these surface properties. In general, the instrument used in this method shall consist of an incandescent light source furnishing an incident beam, means for locating the surface of the test specimen, and a receptor located to receive the required pyramid of rays reflected by the specimen. The receptor shall be a photosensitive device responding to visible radiation. Unless specified otherwise, gloss measurements according to ASTM D 2457 were tested/specified at an angle of 45 degrees. This test method was approved on Mar. 1, 2008 and published March 2008, the contents of which are incorporated herein by reference in its entirety. For the referenced ASTM standards, visit the ASTM website, www.astm.org, or contact ASTM Customer Service at service@astm.org.

The term "ASTM D 1922" as used herein refers to the standard test method for determining the propagation tear resistance of plastic film and thin sheeting by the pendulum method. In general, this test method provides the relative ranking for tear resistance of various plastic films and thin sheetings of comparable thickness. The force in grams required to propagate tearing across a film or sheeting specimen is measured using a precisely calibrated pendulum device. Acting by gravity, the pendulum swings through an arc, tearing the specimen from a precut slit (e.g., a pendulum impulse-type testing apparatus). The specimen is held on one side by the pendulum and on the other side by a stationary member. The loss in energy by the pendulum is indicated by a pointer. The scale indication is a function of the force required to tear the specimen. This test method was approved on May 1, 2009 and published June 2009, the contents of which are incorporated herein by reference in its entirety. For the referenced ASTM standards, visit the ASTM website, www.astm.org, or contact ASTM Customer Service at service@astm.org.

The term "ASTM F 1249" as used herein refers to the standard test method for determining the water vapor transmission rate through plastic film and sheeting using a modulated infrared sensor. In general, this test method describes procedures for obtaining reliable values for the WVTR of plastic film and sheeting. A dry chamber is separated from a wet chamber of known temperature and humidity by the barrier material to be tested. The dry chamber and the wet chamber make up a diffusion cell in which the test film is sealed. Water vapor diffusing through the film mixes with the gas in the dry chamber and is carried to a pressure-modulated infrared sensor. This sensor measures the fraction of infrared energy absorbed by the water vapor and produces an electrical signal, the amplitude of which is proportional to water vapor concentration. The amplitude of the electrical signal produced by the test film is then compared to the signal produced by measurement of a calibration film of known water vapor transmission rate. This information is then used to calculate the rate at which moisture is transmitted through the material being tested. WVTR is an important property of packaging materials and can be directly related to shelf life and packaged product stability. This test method was approved on Oct. 1, 2013 and published November 2013, the contents of which are incorporated herein by reference in its entirety. For the referenced ASTM standards, visit the ASTM website, www.astm.org, or contact ASTM Customer Service at service@astm.org. Unless specified otherwise, the water vapor transmission rates reported in this disclosure were tested according to ASTM F 1249 under 37.8° C., at 100% relative humidity, and at 760 mm Hg.

The term "ASTM D 6474-12" as used herein refers to the standard test method for the determination of molecular weight distributions and molecular weight averages of linear polyolefins by high temperature gel permeation chromatography (GPC). This test method uses commercially available polystyrene standards and equipment and is applicable to polyethylenes (excluding high pressure low density polyethylene—LDPE) and polypropylenes soluble in 1,2,4-trichlorobenzene (TCB) at 140° C. This test method is not absolute and requires calibration. Unless specified otherwise, measurements according to ASTM D 6474-12 were tested/specified with PolymerChar GPC-IR instrument, equipped with infrared detector and online viscometer was used with three Agilent Olexis columns and 1,2,4-trichlorobenzene (TCB, stabilized with 300 ppm 2,6-di-tert-butyl-4-methyl-phenol) as solvent at 145° C. and at a constant flow rate of 1 mL/min. An amount of about 300 µL of sample solution was injected per analysis. The column was calibrated using a relative calibration with 12 narrow MWD polystyrene (PS) standards in the range of 0.474 kg/mole to 3,510 kg/mole. All samples were prepared by dissolving 16 mg of sample in 8 mL (at 160° C.) of stabilized TCB (same as mobile phase) and keeping for 1 hour with continuous shaking prior sampling in the GPC instrument. For the referenced ASTM standards, visit the ASTM website, www.astm.org, or contact ASTM Customer Service at service@astm.org, for ASTM D6474-12, Standard Test Method for Determining Molecular Weight Distribution and Molecular Weight Averages of Polyolefins by High Temperature Gel Permeation Chromatography, ASTM International, West Conshohocken, Pa., 2012, the contents of which are incorporated herein by reference in its entirety.

DETAILED DESCRIPTION

Illustrative aspects of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

A. Film Structure

Aspects of the disclosed subject matter are directed to film structures comprising at least the three layers described generally as an A layer (i.e., outer skin layer), a B layer (i.e., a core layer), and C layer (i.e., an inner skin or sealant layer). The C layer is adjacent the first side of the B layer, and the A layer is adjacent the second side of the B layer. For example, FIG. 1 illustrates a representative 3-layer film structure, i.e., A/B/C film structure comprising a B layer positioned between an A layer and a C layer.

In some aspects, the film structure can have the three layers as described above, while in other aspects, the film structure can have four or more layers. Thus, the B layer is not limited only to a middle layer in between the A layer and the C layer, i.e., other layers can be present. The A layer and the C layer are described as being positioned on a first and a second side, respectively, of the B layer. An additional layer, or layers, can be between the B layer and the A layer, and likewise, between the B and the C layer.

In an aspect, the A layer is present in an amount ranging from 15 to 25 wt. %, based on the total weight of the film structure. The A layer may be present in an amount of 15 wt. %, based on the total weight of the film structure.

In an aspect, the B layer is present in an amount ranging from 50 to 70 wt. %, based on the total weight of the film structure. The B layer may be present in an amount of 70 wt. %, based on the total weight of the film structure.

In an aspect, the C layer is present in an amount ranging from 15 to 25 wt. %, based on the total weight of the film structure. The C layer may be present in an amount of 15 wt. %, based on the total weight of the film structure.

In an aspect, the film structure has a 1% secant modulus in the machine direction ranging from 45,000 to 75,000 psi (310 to 517 MPa). The film structure may have a 1% secant modulus in the machine direction ranging from 53,300 to 68,400 psi (367 to 472 MPa). The film structure may have a 1% secant modulus in the machine direction of 53,300, 61,200, 64,500, or 68,400 psi (367, 422, 445, or 472 MPa). The foregoing 1% secant modulus in the machine direction is measured according to ASTM D 882.

In an aspect, the film structure has a machine direction tear strength ranging from 140 to 600 grams. The film structure may have a machine direction tear strength ranging 156 to 564 grams. The film structure may have a machine direction tear strength of 156, 230, 429, or 564 grams. The foregoing machine direction tear strength is measured according to ASTM D 1922.

In an aspect, the film structure has a normalized water vapor transmission rate (WVTR) ranging from 0.38 to 0.68 grams/100 in$^2$/day (5.89 to 10.54 g/m$^2$/day). The film structure may have a normalized water vapor transmission rate (WVTR) ranging from 0.43 to 0.64 grams/100 in$^2$/day (6.67 to 9.92 g/m$^2$/day). The film structure may have a normalized water vapor transmission rate (WVTR) of 0.43, 0.46, 0.52, or 0.64 grams/100 in$^2$/day (6.67, 7.13, 8.06, 9.92 g/m$^2$/day). The foregoing normalized water vapor transmission rate (WVTR) is measured according to ASTM F 1249.

In an aspect, the film structure has a transverse direction tear strength ranging from 550 to 1,200 grams. The film structure may have a transverse direction tear strength ranging from 586 to 1,145 grams. The film structure may have a transverse direction tear strength of 586, 719, 1,005, or 1,145 grams. The foregoing transverse direction tear strength is measured according to ASTM D 1922.

In an aspect, the film structure has a 1% secant modulus in the transverse direction ranging from 50,000 to 70,000 psi (345 to 483 MPa). The film structure may a 1% secant modulus in the transverse direction 55,000 to 62,500 psi (379 to 431 MPa). The film structure may a 1% secant modulus in the transverse direction of 55,000, 60,800, 61,500, or 62,500 psi (379, 419, 424, or 431 MPa). The foregoing 1% secant modulus in the transverse direction is measured according to ASTM D 882.

In an aspect, the film structure has a gloss ranging from 42 to 52. The film structure may have a gloss ranging from 45 to 49. The film structure may have a gloss of 45, 47, or 49. The foregoing gloss is measured according to ASTM D 2457.

In an aspect, the film structure has a haze ranging from 15% to 20%. The film structure may have a haze ranging from 16% to 18%. The film structure may have a haze of 16%, 17%, or 18%. The foregoing haze is measured according to ASTM D 1003.

The film structures described in this disclosure are not limited to any particular film thickness, however, film structures useful in many end-use applications generally have an average film thickness ranging from about 0.7 mil to about 3.0 mil. The film structure may have an average film thickness of 2.0 mil.

A1. A Layer

The A layer comprises high density polyethylene (HDPE). In an aspect, the HDPE has a melt index ranging from 0.4 to 2.5 g/10 min, as measured according to ASTM D 1238. The HPDE may have a melt index of 2.0 g/10 min, as measured according to ASTM D 1238.

In an aspect, the HDPE has a density ranging from 0.940 to 0.970 g/cm$^3$, as measured according to ASTM D 1505. The HDPE may have a density of 0.959 g/cm$^3$, as measured according to ASTM D 1505.

In an aspect, the HDPE has a polydispersity index ranging from 1.8 to 18.0, as measured by ASTM D 6474-12.

Suitable examples of HDPE of the A layer include, without limitation, Alathon® M6020SB HDPE, Alathon® L5485 HDPE, Alathon® L5885 HDPE and Alathon® M6210 HDPE, all of which are commercially available from LyondellBasell industries Holdings, B.V.

The A layer may further comprise a nucleating agent. In an aspect, the nucleating agent of the A layer is present in an amount ranging from 0.05 wt. % to 0.30 wt. % (500 to 3000 ppm, on a weight basis), based on the total weight of the A layer. In an aspect, the HDPE and the nucleating agent may be blended together to form a nucleated HDPE.

The nucleating agent of the A layer may be an organic nucleating agent. For example, the organic nucleating agent may comprise one or more of metal carboxylates, metal aromatic carboxylate, hexahydrophthalic acid metal salts, stearates, organic phosphates, bisamides, sorbitols, and mixtures thereof. For example, suitable commercial examples of nucleating agents may include, without limitation, one or more of Hyperform® HPN-20E (which is a mixture of zinc stearate and a calcium salt of 1,2-cyclohexanedicarboxylic acid) or Hyperform® HPN-210M (which is a mixture of zinc stearate and sodium;4-[(4-chlorobenzoyl)amino]benzoate), both of which are commercially available from Milliken & Company.

In an aspect, the A layer may comprise a blend of two or more polyolefins. For example, the A layer may comprise a blend comprising (a) HDPE homopolymer or a HDPE copolymer in an amount ranging from 40 to 100 wt. %, based on the total weight of the A layer, (b) LLDPE in an amount ranging from 0 to 50 wt. %, based on the total weight of the A layer, and (c) a nucleating agent in an amount up to 0.30 wt. % (up to 3000 ppm), based on the total weight of the A layer. In other aspects, the A layer may comprise a blend of HDPE (or nucleated HDPE) and one selected from the group consisting of HDPE, LLDPE, LDPE, and any blend or combination thereof.

A2. B Layer

The B layer comprises linear low density polyethylene (LLDPE) and a nucleating agent. In one aspect, the LLDPE of the B layer has a melt index ranging from 0.4 to 2.5 g/10 min. In another aspect, the LLDPE of the B layer has a melt index ranging from 0.6 to 1.0 g/10 min. In yet another aspect, the LLDPE of the B layer has a melt index of 0.6, 0.75, or 1.0 g/10 min. In each of the foregoing aspects, the melt index is measured according to ASTM D 1238.

In an aspect, the LLDPE of the B layer has a density ranging from 0.910 to 0.922 g/cm$^3$. In another aspect, the LLDPE of the B layer has a density ranging from 0.916 to 0.920 g/cm$^3$. In yet another aspect, the LLDPE of the B layer may have a density of 0.916, 0.918, or 0.920 g/cm$^3$. The foregoing densities are measured according to ASTM D 1505.

In an aspect, the LLDPE of the B layer has a polydispersity index ranging from 2.0 to 16.0, as measured by ASTM D 6474-12. In another aspect, the LLDPE of the B layer has a polydispersity index ranging from 5.0 to 16.0. In each of the foregoing aspects, the polydispersity index is measured according to ASTM D 6474-12.

In one aspect, the LLDPE of the B layer may include ethylene derived units copolymerized with a comonomer selected from the group consisting of 1-butene, 1-hexene, 1-octene, and any combination of two or more of the foregoing. The LLDPE of the B layer may include a metallocene-derived LLDPE, a Ziegler-Natta-derived LLDPE, and/or any LLDPE derived from any other catalyst known in the art. In another aspect, the comonomer is present in an amount ranging from 4 to 30 wt. %, based upon the total weight of the LLDPE.

Examples of suitable LLDPE that may comprise the B layer include, without limitation, LLDPE having the tradenames Petrothene® GA501023, Petrothene® GA502023, Petrothene® GA601030, Petrothene® Select GS906062, and Petrothene® GA808091, all of which are commercially available from LyondellBasell Industries Holdings, B.V.

In an aspect, the nucleating agent is present in an amount ranging from 0.05 wt. % to 0.30 wt. % (500 to 3000 ppm), based on the total weight of the B layer. In an aspect, the LLDPE and the nucleating agent may be blended together to form a nucleated LLDPE.

The nucleating agent of the B layer may be an organic nucleating agent. For example, the organic nucleating agent may comprise one or more of metal carboxylates, metal aromatic carboxylate, hexahydrophthalic acid metal salts, stearates, organic phosphates, bisamides, sorbitols, and mixtures thereof. Suitable commercial examples of nucleating agents may include, without limitation, one or more of Hyperform® HPN-20E (which is a mixture of zinc stearate and a calcium salt of 1,2-cyclohexanedicarboxylic acid) or Hyperform® HPN-210M (which is a mixture of zinc stearate and sodium;4-[(4-chlorobenzoyl)amino]benzoate), both of which are commercially available from Milliken & Company.

In an aspect, the LLDPE may comprise a blend of two or more types of polyolefins. For example, the LLDPE may be a blend of LLDPE and one or more high density polyethylenes (HDPEs). Thus, in some aspects, the B layer may comprise (a) one or more LLDPEs present in an amount ranging from 40 to 100 wt. %, based upon the total weight of the B layer; (b) one or more HDPEs present in an amount ranging from 0 to 50 wt. %, based upon the total weight of the B layer; and (c) a nucleating agent in an amount ranging from 0.05 wt. % to 0.30 wt. % (500 to 3000 ppm, on a weight basis), based on the total weight of the B layer. In other aspects, the B layer may comprise a blend of LLDPE and one selected from the group consisting of HDPE, LLDPE, LDPE, and any blend or combination thereof.

Suitable examples of HDPE that may be blended with the LLDPE of the B layer include, without limitation, HDPE such as Alathon® M6020SB, Alathon® L5485, Alathon® L5885, and Alathon® M6210, all of which are commercially available from LyondellBasell Industries Holdings, B.V.

A3. C Layer

In an aspect, the C layer comprises one or more polymers. In another aspect, the C layer has a melt index ranging from 0.1 to 3.0 g/10 min, as measured according to ASTM D 1238. In still another aspect, the C layer may have a melt index of 1.0 g/10 min, as measured according to ASTM D 1238.

In an aspect, the C layer has a density ranging from 0.910 to 0.955 g/cm$^3$, as measured according to ASTM D 1505. In another aspect, the C layer may have a density of 0.920 g/cm$^3$, as measured according to ASTM D 1505.

In an aspect, the one or more polymers of the C layer may be selected from the group consisting of LDPE, ethylene vinyl acetate copolymer (EVA), metallocene-derived LLDPE, ionomer, and any combination of two or more of the foregoing.

Suitable examples of LDPE that may be used in the C layer include, without limitation, LDPE having the tradenames Petrothene® NA960000, and Petrothene®, which are commercially available from LyondellBasell Industries Holdings, B.V, and Exceed™ 1018, which is commercially available from ExxonMobil.

A4. Additional Layer(s)

As described above, in some aspects, the film structure can have four or more layers, i.e., one or more additional layers in addition to the A layer, the B layer, and the C layer. Thus, the B layer is not limited only to a middle layer in between the A layer and the C layer, i.e., other layers can be present. The A layer and the C layer are described as being positioned on a first and a second side, respectively, of the B layer. An additional layer, or layers, can be between the B layer and the A layer, and likewise, between the B and the C layer.

The one or more additional layers may comprise one or more polymers. For example, in an aspect, the one or more additional layers may comprise any of the polymers discussed above as being polymer options for the A layer, the B layer, and/or the C layer: for example, LLDPE, HDPE, a LDPE, or any blend or combination thereof. Additional polymers that can be employed either singly or in combination in the one or more additional layers can include, but are not limited to, ethylene vinyl alcohol (EVOH), tie-layers, Nylon, or combinations thereof. Non-limiting examples of EVOH include resins such as Kuraray Eval™ F171B, Kuraray Eval™ J171B, and Kuraray Eval™ E171B, all of which are commercially available from Kuraray America, Inc. Non-limiting examples of tie-layers include Equistar Plexar® PX3060, Equistar Plexar® PX3227, and Equistar Plexar® PX3236, all of which are commercially available from LyondellBasell. Non-limiting examples of Nylon include UBE Industries 5033 and UBE industries 5034, which are commercially available from Ube Industries, Ltd., as well as AdvanSix Aegis® BarrierPro2™, which is commercially available from AdvanSix Inc.

A5. Additives

Additives are often used in polymer films and formulations to improve the processing or ease of manufacturing of the polymer(s) and its intended finished article. Another use of additives is to impart a certain property or characteristic to the finished article. In an aspect, one or more additives can be employed in the A layer, and/or the B layer, and/or the C layer. Suitable additives which can be employed in the film structures or compositions disclosed herein can include, but are not limited to, antioxidants, acid scavengers, antiblock additives, slip additives, colorants, fillers, polymer processing aids, UV inhibitors, or any combination of two or more of the foregoing. Therefore, in certain aspects, the film structure can comprise an additive selected from an antioxidant, an acid scavenger, an antiblock additive, a slip additive, a colorant, a filler, a polymer processing aid, a UV inhibitor, and the like, or any combination of two or more of the foregoing.

B. Methods for Producing Film Structures

Methods for producing the above film structures are disclosed herein. In an aspect, a method for producing a film structure comprises film blowing (i) an A layer comprising high density polyethylene, (ii) a B layer comprising linear low density polyethylene and a nucleating agent; and (iii) a C layer comprising one or more polymers having (a) a melt index ranging from 0.1 to 3.0 g/10 min, as measured according to ASTM D 1238 and (b) a density ranging from 0.912 to 0.935 g/cm$^3$, as measured according to ASTM D 1505. The film structures described in this disclosure may also be produced using extruder equipment known to those of skill in the art, for example, a 3-layer, Brampton Engineering blown film line.

The foregoing film blowing forms a film structure having the B layer positioned between the A layer and the C layer, as illustrated in FIG. 1.

C. Articles of Manufacture

Film structures described herein can be used to produce various articles of manufacture. For example, food packaging films can be formed from and/or can comprise a film structure in accordance with the subject matter disclosed herein. As an example, the film structure can be used. as packaging for items such as cereal, cookies, and crackers. Other suitable articles of manufacture and end-use applications are readily apparent to those of skill in the art in view of this disclosure, and are encompassed herein.

EXAMPLES

To facilitate a better understanding of the present disclosure, the following examples of embodiments are provided. In no way should the following examples be read to limit, or to define, the scope of the appended claims.

Description of Materials Used in the Examples

TABLE 1

High Density Polyethylene (HDPE) Used as A Layer, Low Density Polyethylene (LDPE) used as C Layer, and Nucleating Agent.

| Component | Commercial Name |
| --- | --- |
| HDPE-1 | Petrothene® M6020SB |
| LDPE-1 | Petrothene® NA960000 |
| Nucleating Agent used to produce nucleated LLDPEs of the Examples | Hyperform® HPN-210M |

TABLE 2

Linear Low Density Polyethylene (LLDPE) Used as B Layer and Selected Properties of the Same.

| LLDPE | Commercial Name | Co-monomer | Melt Index, g/10 min | Base Resin Density, g/cm$^3$ |
|---|---|---|---|---|
| LLDPE-1 | Petrothene® GA501023 | Butene | 1.0 | 0.918 |
| LLDPE-2 | Petrothene® GA601030 | Hexene | 1.0 | 0.918 |
| LLDPE-3 | Petrothene® Select GS906062 | Hexene | 0.6 | 0.916 |
| LLDPE-4 | Petrothene® GA808091 | Hexene | 0.75 | 0.920 |

Example 1 (Ex. 1)

Using a 3-layer, Brampton Engineering blown film line with a die size of 6 inches, a 2.0 mil film with a 15 wt. %-70 wt. %-15 wt. A/B/C layer distribution was made using HDPE-1 as the A layer, nucleated LLDPE-1 as the B layer, and LDPE-1 in the C layer. The blow-up ratio was 2.5:1, and the frost-line height was 24 inches. Total output was 150 pounds per hour. The die gap was 0.060 inches, and the line had a dual-lip air ring. The skin layer extruders (i.e., the extruders used to produce the A layer and C layer) were each smooth bore with a 1.5-inch screw with mixing sections and a 30:1 L/D ratio. The core layer extruder (i.e., the extruder for the B layer) was also smooth bore with a 2-inch barrier screw and a 30:1 L/D ratio.

Example 2 (Ex. 2)

Example 1 is repeated except nucleated LLDPE-2 was used as the B layer.

Example 3 (Ex. 3)

Example 1 is repeated except nucleated LLDPE-3 was used as the B layer.

Example 4 (Ex. 1)

Example 1 is repeated except nucleated LLDPE-4 was used as the B layer.

Comparative Example 1 (CE 1)

Example 1 is repeated except LLDPE-1 was used as the B layer. The LLDPE-1 was not nucleated.

Comparative Example 2 (CE 2)

Comparative Example 1 is repeated except LLDPE-2 was used as the B layer. The LLDPE-2 was not nucleated.

Comparative Example 3 (CE 3)

Comparative Example 1 is repeated except LLDPE-3 was used as the B layer. The LLDPE-3 was not nucleated.

Comparative Example 4 (CE 4)

Comparative Example 1 is repeated except LLDPE-4 was used as the B layer. The LLDPE-4 was not nucleated.

TABLE 3

Summary of Film Structures of the Examples.

| Film Structure | A Layer | B Layer* | C Layer |
|---|---|---|---|
| Ex. 1 | HDPE-1 (15 wt. %) | LLDPE-1 (70 wt. %) | LDPE-1 (15 wt. %) |
| CE 1 | HDPE-1 (15 wt. %) | Nucleated LLDPE-1 (70 wt. %) | LDPE-1 (15 wt. %) |
| Ex. 2 | HDPE-1 (15 wt. %) | LLDPE-2 (70 wt. %) | LDPE-1 (15 wt. %) |
| CE 2 | HDPE-1 (15 wt. %) | Nucleated LLDPE-2 (70 wt. %) | LDPE-1 (15 wt. %) |
| Ex. 3 | HDPE-1 (15 wt. %) | LLDPE-3 (70 wt. %) | LDPE-1 (15 wt. %) |
| CE 3 | HDPE-1 (15 wt. %) | Nucleated LLDPE-3 (70 wt. %) | LDPE-1 (15 wt. %) |
| Ex. 4 | HDPE-1 (15 wt. %) | LLDPE-4 (70 wt. %) | LDPE-1 (15 wt. %) |
| CE 4 | HDPE-1 (15 wt. %) | Nucleated LLDPE-4 (70 wt. %) | LDPE-1 (15 wt. %) |

*The nucleating agent was Milliken HPN-210M for the LLDPEs referred to as "nucleated" in Table 3.

In Table 4, the results for certain properties of the film structures of the Examples are presented.

Figure 2:
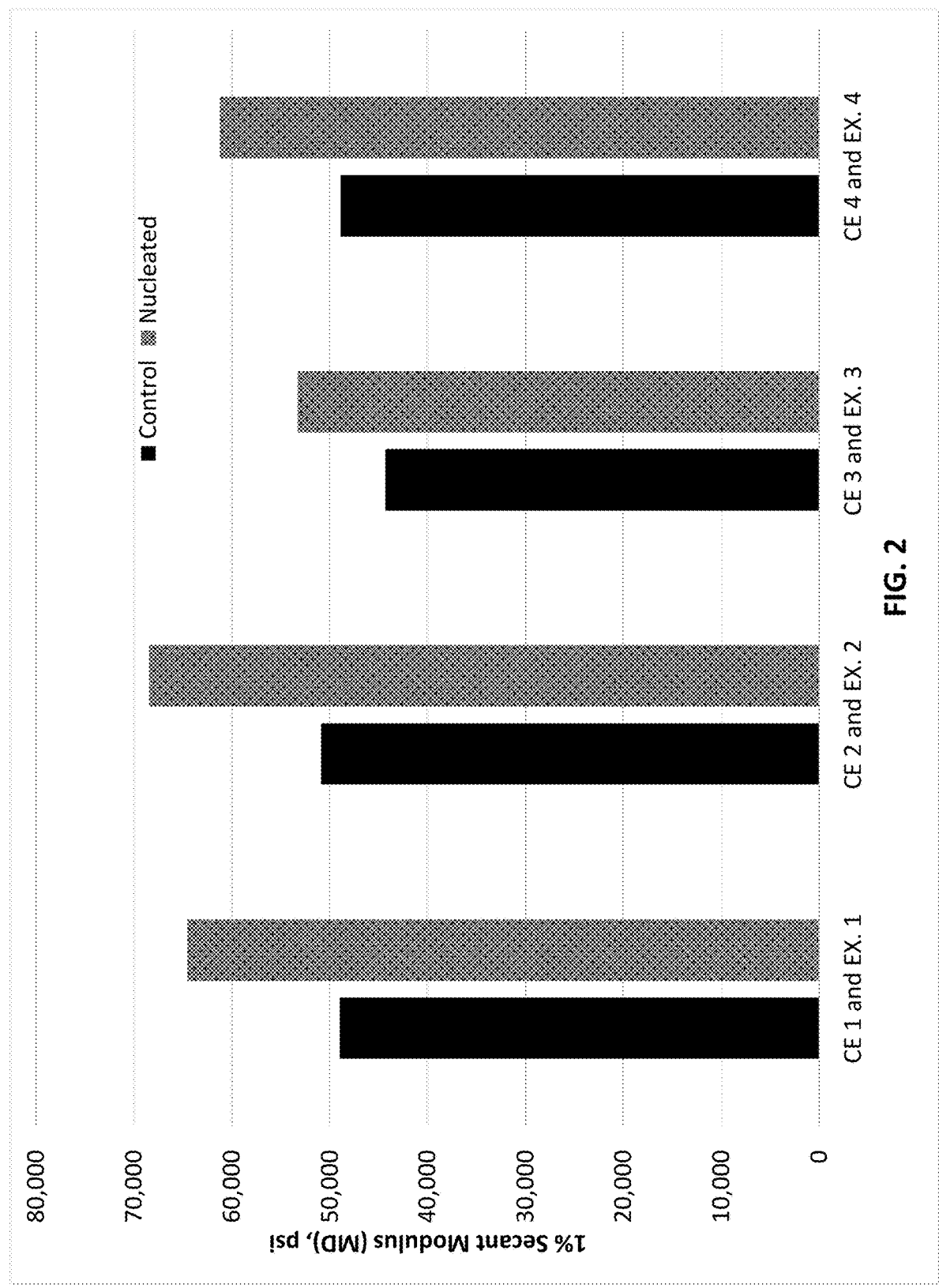
FIG. 2 illustrates a chart of the 1% secant modulus in the machine direction of Example 1, Example, 2, Example 3, Example 4, Comparative Example 1, Comparative Example 2, Comparative Example 3, and Comparative Example 4.

FIG. 2 illustrates the 1% secant modulus in the machine direction improved for film structures employing a B layer comprising a LLDPE and a nucleating agent as compared to film structures employing a B layer without a nucleating agent.

Figure 3:
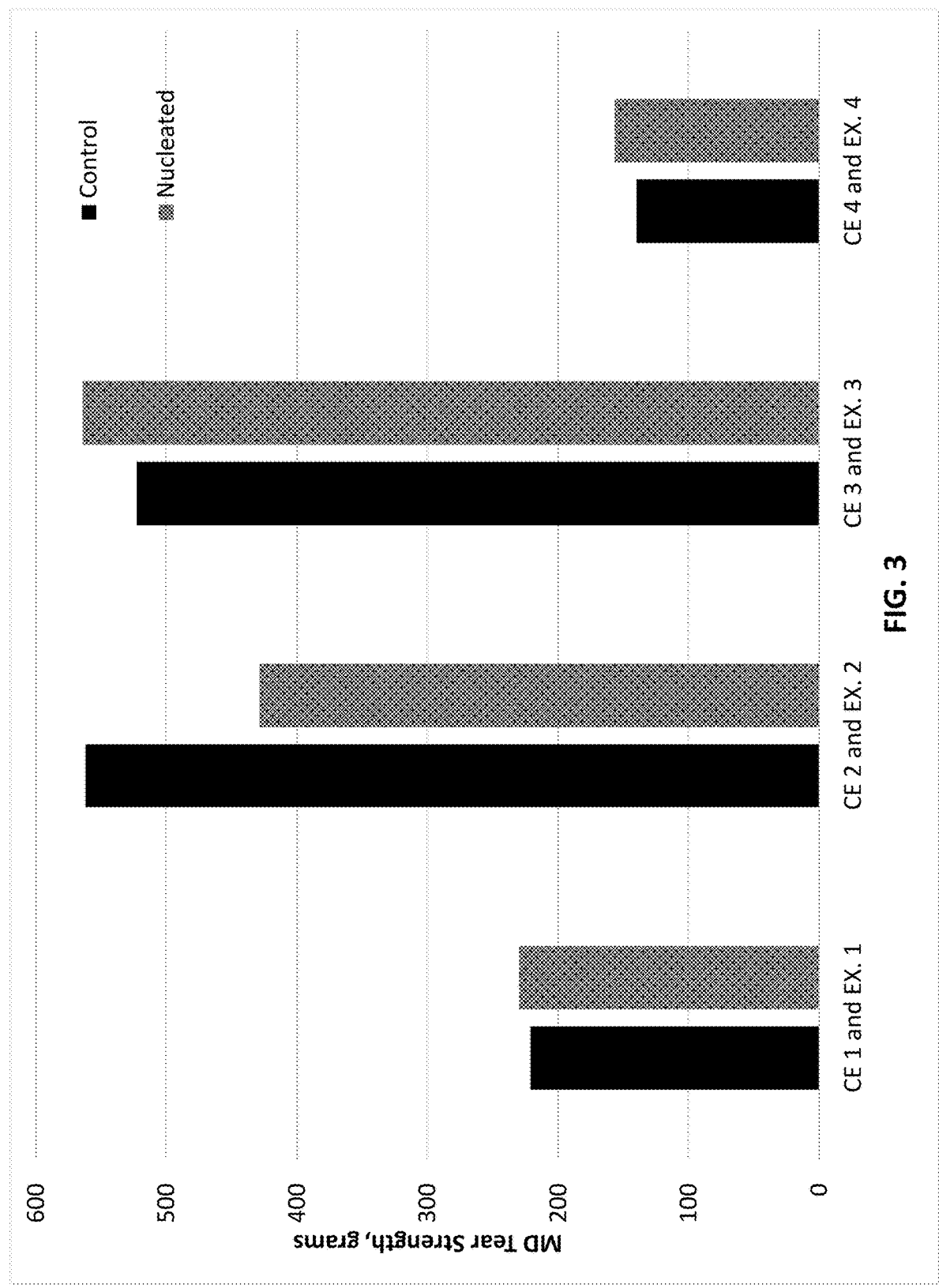
FIG. 3 illustrates a chart of the machine direction tear strength of Example 1, Example, 2, Example 3, Example 4, Comparative Example 1, Comparative Example 2, Comparative Example 3, and Comparative Example 4.

FIG. 3 illustrates the machine direction tear strength mostly improved for film structures employing a B layer comprising a LLDPE and a nucleating agent as compared to film structures employing a B layer without a nucleating agent.

Figure 4:
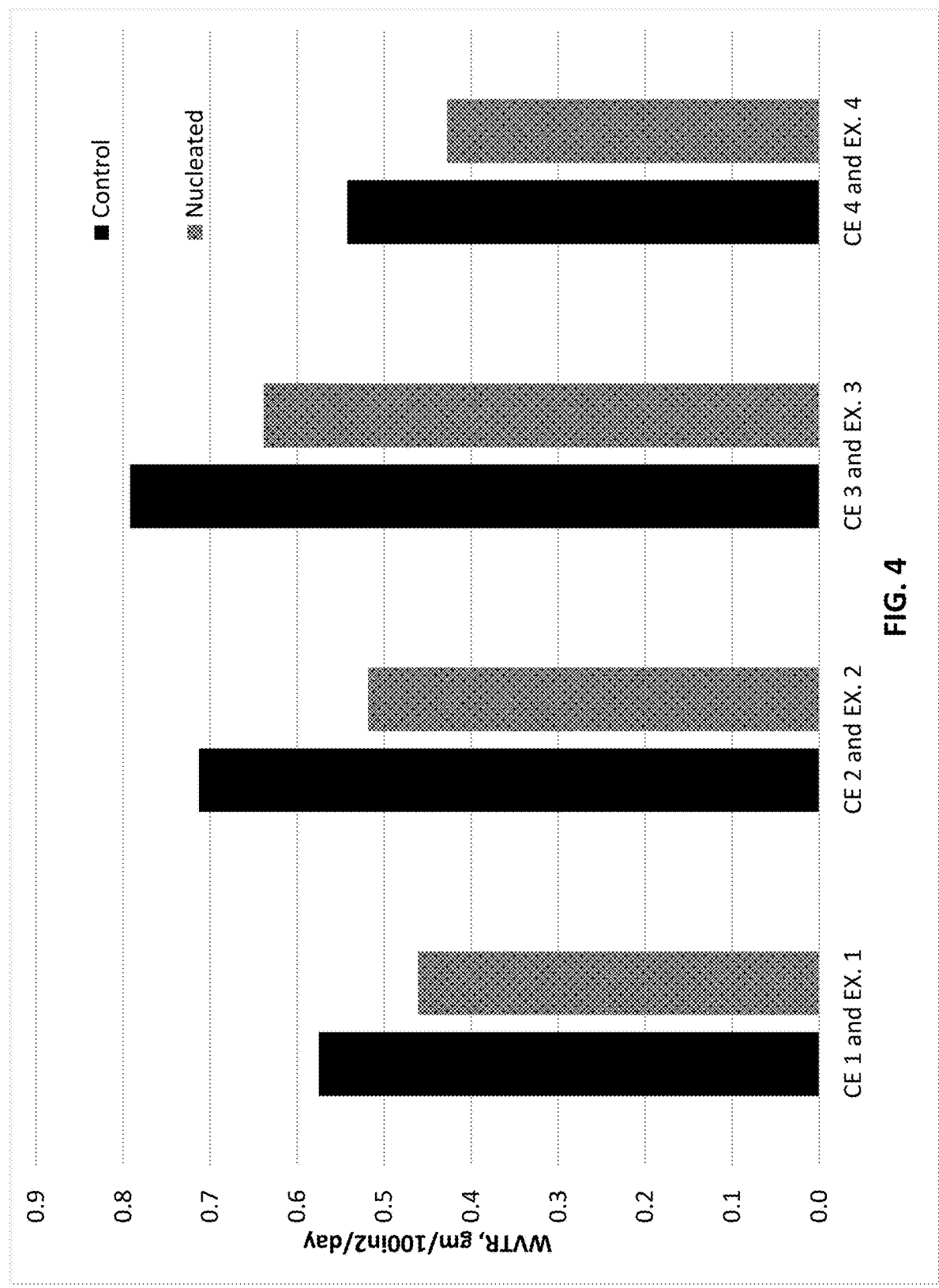
FIG. 4 illustrates a chart of the normalized water vapor transmission rate of Example 1, Example, 2, Example 3, Example 4, Comparative Example 1, Comparative Example 2, Comparative Example 3, and Comparative Example 4.

FIG. 4 illustrates the water vapor transmission rate (WVTR) reduced for film structures employing a B layer comprising a LLDPE and a nucleating agent as compared to film structures employing a B layer without a nucleating agent. The reduction in water vapor transmission rate (WVTR) indicates improved moisture protection for such films.

While not wishing to be bound by the following theory, the results, as illustrated in Table 4 and FIG. 2, FIG. 3, and FIG. 4, suggest that film structures employing a B layer comprising a LLDPE and a nucleating agent exhibit improved moisture protection and mechanical properties, as compared to film structures employing a B layer without a nucleating agent, while also having desirable optical properties (e.g., gloss and/or haze).

TABLE 4

Results for Certain Properties of the Film Structures of the Examples.

| Prop. | Units | Ex. 1 | CE 1 | Ex. 2 | CE 2 | Ex. 3 | CE 3 | Ex. 4 | CE 4 |
|---|---|---|---|---|---|---|---|---|---|
| Gloss | | 49 | 49 | 48 | 47 | 45 | 45 | 44 | 49 |
| Haze | % | 16 | 16 | 17 | 18 | 17 | 18 | 17 | 17 |
| 1% Secant Modulus (MD) | psi | 49,000 | 64,500 | 50,900 | 68,400 | 44,300 | 53,300 | 48,900 | 61,200 |
| | MPa | 338 | 445 | 351 | 472 | 305 | 367 | 337 | 422 |
| 1% Secant Modulus (TD) | psi | 57,600 | 62,500 | 59,500 | 60,800 | 53,700 | 55,000 | 56,900 | 61,500 |
| | MPa | 397 | 431 | 410 | 419 | 370 | 379 | 392 | 424 |
| Tear Strength (MD) | g | 221 | 230 | 562 | 429 | 523 | 564 | 140 | 156 |
| Tear Strength (TD) | g | 612 | 586 | 1,121 | 1,005 | 1,057 | 1,145 | 654 | 719 |
| WVTR* | g/100 in²/day | 0.58 | 0.46 | 0.71 | 0.52 | 0.79 | 0.64 | 0.54 | 0.43 |
| | g/m²/day | 8.92 | 7.14 | 11.05 | 8.03 | 12.28 | 9.90 | 8.41 | 6.62 |

*WVTR normalized to 1 mil, after measurement according to ASTM F 1249.
The film structures above are A/B/C structures having an average thickness of 2.0 mil.

The subject matter is described above with reference to numerous aspects and specific examples. Many variations will suggest themselves to those skilled in the art in light of the above detailed description. All such obvious variations are within the full intended scope of the appended claims. Other aspects of the subject matter disclosed herein can include, but are not limited to, the following (aspects are described as "comprising" but, alternatively, can "consist essentially of", or "consist of"):

Aspect 1. A film structure comprising:
(A) an A layer, wherein the A layer comprises high density polyethylene;
(B) a B layer, wherein the B layer comprises: (i) linear low density polyethylene; and (ii) a nucleating agent; and
(C) a C layer, wherein the C layer comprises one or more polymers and the C layer has (i) a melt index ranging from 0.1 to 3.0 g/10 min, as measured according to ASTM D 1238; and (ii) a density ranging from 0.910 to 0.955 g/cm³, as measured according to ASTM D 1505;
wherein the B layer is positioned between the A layer and the C layer;
wherein the film structure has a 1% secant modulus in the machine direction ranging from 45,000 to 75,000 psi (310 to 517 MPa), as measured according to ASTM D 882;
wherein the film structure has a machine direction tear strength ranging from 156 to 564 grams, as measured according to ASTM D 1922; and
wherein the film structure has a normalized water vapor transmission rate ranging from 0.38 to 0.68 grams/100 in²/day (5.89 to 10.54 g/m²/day), as measured according to ASTM F 1249.

Aspect 2. The film structure defined in Aspect 1, wherein the B layer is present in an amount ranging from 50 to 70 wt. %, based on the total weight of the film structure.

Aspect 3. The film structure defined in any one of Aspects 1-2, wherein the A layer is present in an amount ranging from 15 to 25 wt. %, based on the total weight of the film structure.

Aspect 4. The film structure defined in any one of Aspects 1-3, wherein C layer is present in an amount ranging from 15 to 25 wt. %, based on the total weight of the film structure.

Aspect 5. The film structure defined in any one of Aspects 1-4, wherein the film structure has a transverse direction tear strength ranging from 550 to 1,200 grams, as measured according to ASTM D 1922.

Aspect 6. The film structure defined in any one of Aspects 1-5, wherein the film structure has a 1% secant modulus in the transverse direction ranging from 50,000 to 70,000 psi (345 to 483 MPa), as measured according to ASTM D 882.

Aspect 7. The film structure defined in any one of Aspects 1-6, wherein the film structure has a gloss ranging from 42 to 52 as measured according to ASTM D 2457.

Aspect 8. The film structure defined in any one of Aspects 1-7, wherein the film structure has a haze ranging from 15% to 20%, as measured according to ASTM D 1003.

Aspect 9. The film structure defined in any one of Aspects 1-8, wherein the nucleated linear low density polyethylene has a melt index ranging from 0.4 to 1.2 g/10 min, as measured according to ASTM D 1238.

Aspect 10. The film structure defined in any one of Aspects 1-9, wherein the linear low density polyethylene has a density ranging from 0.910 to 0.922 g/cm³, as measured according to ASTM D 1505.

Aspect 11. The film structure defined in any one of Aspects 1-10, wherein the linear low density polyethylene has a polydispersity index ranging from 2.0 to 16.0, as measured by ASTM D 6474-12.

Aspect 12. The film structure defined in any one of Aspects 1-11, wherein the linear low density polyethylene comprises ethylene derived units copolymerized with a comonomer selected from the group consisting of 1-butene, 1-hexene, 1-octene, and any combination of two or more of the foregoing.

Aspect 13. The film structure defined in any one of Aspects 1-12, wherein the comonomer is present in an amount ranging from 4 to 30 wt. %, based upon the total weight of the linear low density polyethylene.

Aspect 14. The film structure defined in any one of Aspects 1-13, wherein the nucleating agent is present in an amount ranging from 0.05 wt. % to 0.30 wt. %, based on the total weight of the B layer.

Aspect 15. The film structure defined in any one of Aspects 1-14, wherein the nucleating agent comprises one or more of metal carboxylates, metal aromatic carboxylate, hexahydrophthalic acid metal salts, stearates, organic phosphates, bisamides, sorbitols, and any combination of two or more of the foregoing.

Aspect 16. The film structure defined in any one of Aspects 1-15, wherein the high density polyethylene has (A)

a melt index ranging from 0.4 to 2.5 g/10 min, as measured according to ASTM D 1238; and (B) a density ranging from 0.940 to 0.970 g/cm³, as measured according to ASTM D 1505.

Aspect 17. The film structure defined in any one of Aspects 1-16, wherein the one or more polymers of the C layer are selected from the group consisting of LDPE, ethylene vinyl acetate copolymer (EVA), metallocene-derived LLDPE, ionomer, and any combination of two or more of the foregoing.

Aspect 18. The film structure defined in any one of Aspects 1-17, wherein the A layer further comprises a nucleating agent.

Aspect 19. The film structure defined in any one of Aspects 1-18, wherein the film structure comprises one or more additional layers.

Aspect 20. The film structure defined in any one of Aspects 1-19, wherein the film structure comprises one or more additional layers wherein in each layer comprises one or more selected from the group consisting of HDPE, LDPE, LLDPE, and any combination of two or more of the foregoing.

Aspect 21 A method comprising:
(A) film blowing:
(i) an A layer, wherein the A layer comprises high density polyethylene;
(ii) a B layer, wherein the B layer comprises (a) linear low density polyethylene; and (b) a nucleating agent; and
(iii) a C layer, wherein the C layer comprises one or more polymers and the C layer has (a) a melt index ranging from 0.1 to 3.0 g/10 min, as measured according to ASTM D 1238; and (b) a density ranging from 0.912 to 0.955 g/cm³, as measured according to ASTM D 1505;
so as to form a film structure having the B layer positioned between the A layer and the C layer;
wherein the film structure has a 1% secant modulus in the machine direction ranging from 45,000 to 75,000 psi (310 to 517 MPa), as measured according to ASTM D 882;
wherein the film structure has a machine direction tear strength ranging from 140 to 600 grams, as measured according to ASTM D 1922; and
wherein the film structure has a normalized water vapor transmission rate ranging from 0.38 to 0.68 grams/100 in²/day (5.89 to 10.54 g/m²/day), as measured according to ASTM F 1249.

Aspect 22. The method defined in Aspect 21, wherein the film structure has:
(A) a gloss ranging from 42 to 52 as measured according to ASTM D 2457;
(B) a haze ranging from 15% to 20%, as measured according to ASTM D 1003;
(C) a transverse direction tear strength ranging from 550 to 1,200 grams, as measured according to ASTM D 1922; and
(D) a 1% secant modulus in the transverse direction ranging from 50,000 to 70,000 psi (345 to 483 MPa), as measured according to ASTM D 882.

Aspect 23. A method comprising film blowing at least an A layer, a B layer and a C layer so as to form the film structure defined in any one of Aspects 1-20 and 25-26.

Aspect 24. An article comprising the film structure defined in any one of Aspects 1-20 and 25-26.

Aspect 25. The film structure defined in any one of Aspects 1-20 wherein the A layer is formed from materials comprising high density polyethylene, and a nucleating agent.

Aspect 26. The film structure defined in any one of Aspects 1-20 and 25, wherein the B layer is formed from materials comprising linear low density polyethylene, and a nucleating agent.

What is claimed is:
1. A film structure comprising:
(A) an A layer, wherein the A layer comprises high density polyethylene;
(B) a B layer, wherein the B layer comprises:
  (i) linear low density polyethylene; and
  (ii) a nucleating agent; and
(C) a C layer, wherein the C layer comprises one or more polymers and the C layer has:
  (i) a melt index ranging from 0.1 to 3.0 g/10 min, as measured according to ASTM D 1238; and
  (ii) a density ranging from 0.910 to 0.955 g/cm³, as measured according to ASTM D 1505;
wherein the B layer is positioned between the A layer and the C layer;
wherein the film structure has a 1% secant modulus in the machine direction ranging from 45,000 to 75,000 psi (310 to 517 MPa), as measured according to ASTM D 882;
wherein the film structure has a 1% secant modulus in the transverse direction ranging from 50,000 to 70,000 psi (345 to 483 MPa), as measured according to ASTM D 882;
wherein the film structure has a transverse direction tear strength ranging from 550 to 1,200 grams, as measured according to ASTM D 1922;
wherein the film structure has a machine direction tear strength ranging from 140 to 600 grams, as measured according to ASTM D 1922; and
wherein the film structure has a normalized water vapor transmission rate ranging from 0.38 to 0.68 grams/100 in²/day (5.89 to 10.54 g/m²/day), as measured according to ASTM F 1249.

2. The film structure of claim 1, wherein the B layer is present in an amount ranging from 50 to 70 wt. %., based on the total weight of the film structure.

3. The film structure of claim 2, wherein the A layer is present in an amount ranging from 15 to 25 wt. %, based on the total weight of the film structure.

4. The film structure of claim 3, wherein C layer is present in an amount ranging from 15 to 25 wt. %, based on the total weight of the film structure.

5. The film structure of claim 1, wherein the film structure has a transverse direction tear strength ranging from 612 to 1,145 grams, as measured according to ASTM D 1922.

6. The film structure of claim 5, wherein the film structure has a 1% secant modulus in the transverse direction ranging from 55,000 to 62,500 psi (379 to 431 MPa), as measured according to ASTM D 882.

7. The film structure of claim 6, wherein the film structure has a gloss ranging from 42 to 52 as measured according to ASTM D 2457.

8. The film structure of claim 7, wherein the film structure has a haze ranging from 15% to 20%, as measured according to ASTM D 1003.

9. The film structure of claim 1, wherein the nucleated linear low density polyethylene has a melt index ranging from 0.4 to 1.2 g/10 min, as measured according to ASTM D 1238.

10. The film structure of claim 9, wherein the linear low density polyethylene has a density ranging from 0.910 to 0.922 g/cm³, as measured according to ASTM D 1505.

11. The film structure of claim 10, wherein the linear low density polyethylene has a polydispersity index ranging from 2.0 to 16.0, as measured by ASTM D 6474-12.

12. The film structure of claim 11, wherein the linear low density polyethylene comprises ethylene derived units copolymerized with a comonomer selected from the group consisting of 1-butene, 1-hexene, 1-octene, and any combination of two or more of the foregoing.

13. The film structure of claim 12, wherein the comonomer is present in an amount ranging from 4 to 30 wt. %, based upon the total weight of the linear low density polyethylene.

14. The film structure of claim 1, wherein the nucleating agent is present in an amount ranging from 0.05 wt. % to 0.30 wt. %, based on the total weight of the B layer.

15. The film structure of claim 1, wherein the nucleating agent comprises one or more of metal carboxylates, metal aromatic carboxylate, hexahydrophthalic acid metal salts, stearates, organic phosphates, bisamides, sorbitols, and any combination of two or more of the foregoing.

16. The film structure of claim 1, wherein the high density polyethylene has:
    (A) a melt index ranging from 0.4 to 2.5 g/10 min, as measured according to ASTM D 1238; and
    (B) a density ranging from 0.940 to 0.970 g/cm$^3$, as measured according to ASTM D 1505.

17. The film structure of claim 1, wherein the one or more polymers of the C layer are selected from the group consisting of LDPE, ethylene vinyl acetate copolymer (EVA), metallocene-derived LLDPE, ionomer, and any combination of two or more of the foregoing.

18. The film structure of claim 1, wherein the A layer further comprises a nucleating agent.

* * * * *